United States Patent
Huang et al.

(10) Patent No.: US 11,943,166 B2
(45) Date of Patent: Mar. 26, 2024

(54) TECHNIQUES FOR HYBRID AUTOMATIC REPEAT REQUEST ACKNOWLEDGE RESOURCE INDICATION FOR DOWNLINK SEMI-PERSISTENT SCHEDULING

(71) Applicant: QUALCOMM Incorporated, San Diego, CA (US)

(72) Inventors: Yi Huang, San Diego, CA (US); Wei Yang, San Diego, CA (US); Peter Gaal, San Diego, CA (US); Seyedkianoush Hosseini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 16 days.

(21) Appl. No.: 17/357,714

(22) Filed: Jun. 24, 2021

(65) Prior Publication Data

US 2022/0045826 A1 Feb. 10, 2022

Related U.S. Application Data

(60) Provisional application No. 63/062,948, filed on Aug. 7, 2020.

(51) Int. Cl.
*H04L 5/00* (2006.01)
*H04L 1/1607* (2023.01)
(Continued)

(52) U.S. Cl.
CPC .......... *H04L 5/0055* (2013.01); *H04L 1/1607* (2013.01); *H04W 72/21* (2023.01); *H04W 72/23* (2023.01)

(58) Field of Classification Search
CPC ............... H04L 5/0055; H04L 1/1607; H04W 72/0413; H04W 72/042
See application file for complete search history.

(56) References Cited

U.S. PATENT DOCUMENTS

2010/0111024 A1* 5/2010 Fan .................. H04L 1/1861
370/329
2019/0356455 A1* 11/2019 Yang ................. H04L 5/0055
(Continued)

FOREIGN PATENT DOCUMENTS

EP 3823383 A1 * 5/2021 ............ H04L 1/1854
WO 2019157950 A1 8/2019

OTHER PUBLICATIONS

Huawei, et al., "Discussion on SPS HARQ-ACK Bit Handling in Case of Dynamic Codebook Configuration for eCA", 3GPP Draft, 3GPP TSG RAN WG1 Meeting #84bis, R1-162105, 3rd Generation Partnership Project (3GPP), Mobile Competence Centre, 650, Route Des Lucioles, F-06921 Sophia-Antipolis Cedex, France, vol. RAN WG1, No. Busan, Korea, Apr. 11, 2016-Apr. 15, 2016, Apr. 2, 2016 (Apr. 2, 2016), XP051079952, 5 Pages, Retrieved from the Internet: URL: http://www.3gpp.org/ftp/tsg_ran/WG1_RL1/TSGR1_84b/ Docs/ [retrieved on Apr. 2, 2016] pp. 2-4.

(Continued)

*Primary Examiner* — Michael J Moore, Jr.
(74) *Attorney, Agent, or Firm* — Shumaker & Sieffert, P. A.

(57) ABSTRACT

In an example, a user equipment (UE) may receive, from a base station, a message indicating activation or reactivation of semi-persistent scheduling (SPS) between the UE and the base station. The UE may determine, based on the message, a first resource for transmitting a first acknowledgement/ negative-acknowledgement (ACK/NACK) to acknowledge reception of the message. The UE may also receive, from the base station and subsequent to the receiving of the message, an SPS message. The UE may also determine a second resource for transmitting a second ACK/NACK to acknowledge reception of the SPS message. The UE may also transmit, to the base station, the first ACK/NACK on the first (Continued)

resource and the second ACK/NACK on the second resource.

30 Claims, 7 Drawing Sheets

(51) Int. Cl.
*H04W 72/21* (2023.01)
*H04W 72/23* (2023.01)

(56) References Cited

U.S. PATENT DOCUMENTS

| | | | |
|---|---|---|---|
| 2020/0313809 A1* | 10/2020 | Park | H04L 1/1861 |
| 2022/0007399 A1* | 1/2022 | Rastegardoost | H04L 1/1854 |
| 2022/0021505 A1* | 1/2022 | Ma | H04L 1/1887 |
| 2022/0045826 A1* | 2/2022 | Huang | H04L 5/0053 |
| 2022/0095337 A1* | 3/2022 | Wang | H04L 1/1861 |
| 2022/0095341 A1* | 3/2022 | Huang | H04L 1/1896 |
| 2022/0104187 A1* | 3/2022 | Zhou | H04L 1/1822 |
| 2022/0104231 A1* | 3/2022 | Gou | H04W 72/1273 |
| 2022/0159692 A1* | 5/2022 | Lee | H04L 1/1864 |

OTHER PUBLICATIONS

Huawei, et al., "Remaining Issues of ACK/NAK Multiplexing on PUSCH", 3GPP Draft, 3GPP TSG-RAN-WG1 Meeting #55, R1-084344 Remaining Issues of ACKNAK Multiplexing on PUSCH, 3rd Generation Partnership Project (3GPP), Mobile Competence Centre, 650, Route Des Lucioles, F-06921 Sophia-Antipolis Cedex, France, No. Prague, Czech Republic, Nov. 4, 2008, Nov. 4, 2008 (Nov. 4, 2008), XP050317616, pp. 1-4, [retrieved on Nov. 4, 2008].
International Search Report and Written Opinion—PCT/US2021/039217—ISA/EPO—dated Oct. 5, 2021.
Moderator (LG Electronics): "Outcome of [100b-e-NR-L1enh-URLLC-lloTenh-03]", 3GPP Draft, 3GPP TSG RAN WG1 #100bis, R1-2003002, 3rd Generation Partnership Project (3GPP), Mobile Competence Centre, 650, Route Des Lucioles, F-06921 Sophia-Antipolis Cedex, France, vol. RAN WG1, No. e-Meeting, Apr. 20, 2020-Apr. 30, 2020 May 2, 2020 (May 2, 2020), XP051879966, 17 Pages.

* cited by examiner

TECHNIQUES FOR HYBRID AUTOMATIC REPEAT REQUEST ACKNOWLEDGE RESOURCE INDICATION FOR DOWNLINK SEMI-PERSISTENT SCHEDULING

CROSS-REFERENCE TO RELATED APPLICATION

This application claims the benefit of U.S. Provisional Application No. 63/062,948, entitled "TECHNIQUES FOR HYBRID AUTOMATIC REPEAT REQUEST ACKNOWLEDGE RESOURCE INDICATION FOR DOWNLINK SEMI-PERSISTENT SCHEDULING" and filed on Aug. 7, 2020, which is expressly incorporated by reference herein in its entirety.

TECHNICAL FIELD

Aspects of the present disclosure relate generally to communication systems, and more particularly, to techniques for hybrid automatic repeat request acknowledge (HARQ-ACK) resource indication for downlink (DL) semi-persistent scheduling (SPS).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G NR technologies. 5G NR technologies are a part of a continuous mobile broadband evolution promulgated by Third Generation Partnership Project (3GPP) to meet new requirements associated with latency, reliability, security, scalability (e.g., with Internet of Things (IoT)), and other requirements. In an aspect, 5G NR technologies may include services associated with enhanced mobile broadband (eMBB), massive machine type communications (mMTC), and ultra reliable low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of wireless communications by a user equipment (UE), is provided. The method may include receiving, from a base station, a message indicating activation or reactivation of semi-persistent scheduling (SPS) between the UE and the base station. The method may include determining, based on the message, a first resource for transmitting a first acknowledgement/negative-acknowledgement (ACK/NACK) to acknowledge reception of the message. The method may include receiving, from the base station and subsequent to the receiving of the message, an SPS message. The method may include determining a second resource for transmitting a second ACK/NACK to acknowledge reception of the SPS message. The method may include transmitting, to the base station, the first ACK/NACK on the first resource and the second ACK/NACK on the second resource.

In another aspect, a method of wireless communications by a base station, is provided. The method may include transmitting, to a user equipment (UE), a message indicating activation or reactivation of semi-persistent scheduling (SPS) between the base station and the UE. The method may include transmitting, to the UE, an SPS message subsequent to the transmitting of the message. The method may include receiving, from the UE, a first acknowledgement/negative-acknowledgement (ACK/NACK) to acknowledge reception of the message on a first resource and a second ACK/NACK to acknowledge reception of the SPS message on a second resource.

In another aspect, apparatus and computer-readable mediums for performing the operations of the methods are also disclosed.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
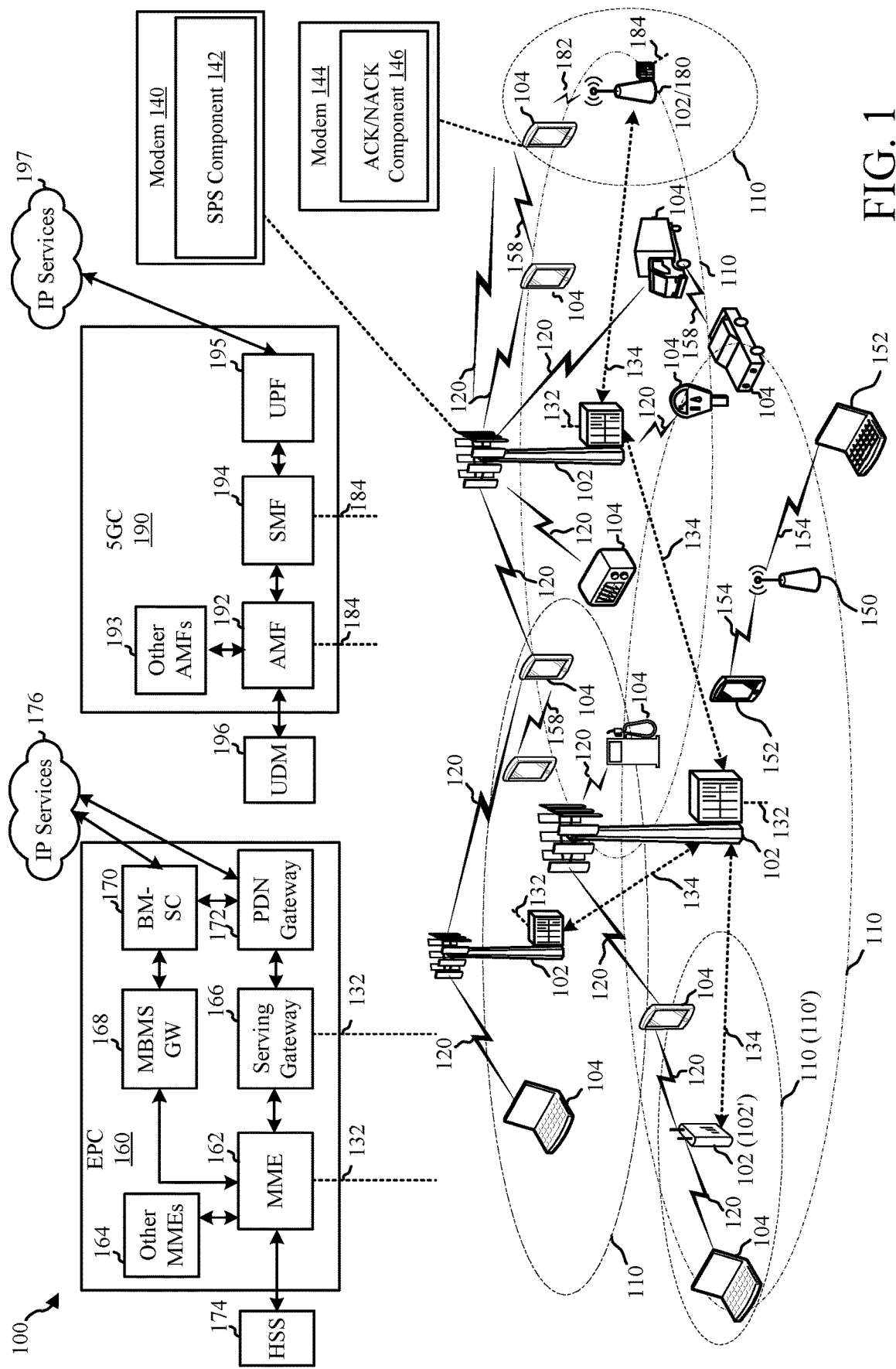
FIG. 1 is a schematic diagram of an example wireless communications system and access network, according to aspects of the present disclosure.

The detailed description, set forth below, in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Conventional mechanisms for downlink (DL) scheduling include semi-persistent scheduling (SPS). As previously described, base stations typically configure SPS resources through the radio resource control (RRC) messages according to a certain periodicity and activate, reactivate, and deactivate SPS transmissions via DL control indicators (DCIs). While some types of services, such as enhanced mobile broadband (eMBB), may implicitly determine acknowledge (ACK) or negative-ACK (NACK) for DCIs based on ACK/NACKs from SPS messages, other services, such as ultra reliable low latency communications (URLLC) are unable to implicitly determine ACK/NACKs from SPS messages due to the added time delays provided through implicit determinations.

Aspects of the present application provide techniques for explicit hybrid automatic repeat request acknowledge (HARQ-ACK) feedback for DCI messages in an SPS scheme. As described herein, a user equipment (UE) may use a dynamically indicated resource (e.g., first resource) to provide ACK/NACK for a DCI message, while using a semi-static resource (e.g., second resource) to provide ACK/NACK for an SPS message. Use of explicit HARQ-ACK feedback, allows all services, including URLLC, on 5G NR technologies to receive feedback for resource allocation provided by DCI messages without implicitly determining ACK/NACK such that some time delays may be avoided.

Turning now to the figures, examples of techniques for HARQ-ACK resource indications for DL SPS are depicted. It is to be understood that aspects of the figures may not be drawn to scale and are instead drawn for illustrative purposes.

Referring to FIG. 1, a diagram illustrating an example of a wireless communications system and an access network 100 is provided. The wireless communications system (also referred to as a wireless wide area network (WWAN)) includes base stations 102, UEs 104, an Evolved Packet Core (EPC) 160, and a 5G Core (5GC) 190.

The base station 102 may include a modem 140 having an SPS component 142 configured to indicate to the UE 104 activation, re-activation, and deactivation of SPS messages along with configuration of the SPS messages.

The UE 104 may include a modem 144 having an ACK/NACK component 146 configured to organize and transmit ACK/NACKs for DCI messages and SPS messages according to messages from the base station 102.

In an aspect, the base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for nonaccess stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). Each of the backhaul links 132, 134, and 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or DL (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

As described herein, conventional techniques of SPS do not use explicit ACK/NACK for activation, re-activation, and de-activation of SPS through DCI messages. Instead, these techniques rely on implicit indications from the ACK/NACK of SPS messages. In particular, conventional techniques require a DCI message (e.g., SPS activation DCI) to dynamically indicate a resource (e.g., Resource A or first resource) for the first SPS message subsequent to the DCI message. The dynamic allocation of the ACK/NACK resource allows the base station 102 to receive an implicit indication from the UE 104 that the SPS message and the DCI message were received by the UE 104. Accordingly, the UE 104 does not send the ACK/NACK on the dynamically indicated ACK/NACK resource until the SPS message is received from the base station 102. The base station 102 may receive ACK/NACKs for subsequent SPS messages on a scheduled semi-static resource (e.g., Resource B or second resource). In conventional SPS techniques, a similar process may be followed for re-activation of SPS messages, in which the base station 102 may transmit a re-activation DCI message to the UE 104 (e.g., subsequent to the activation DCI message) to reconfigure, update, or change certain parameters for SPS transmissions. Further, in conventional SPS techniques, the base station 102 may transmit a deactivation DCI message (e.g., subsequent to an activation or re-activation DCI message) to deactivate SPS transmissions to the UE 104. As disclosed herein, for some services, such as URLLC, the delayed timing caused by the implicit indication of an ACK/NACK for a DCI message, may result in decoding failure for these services. Accordingly, the techniques disclosed herein overcome one or more of these deficiencies.

Figure 2:
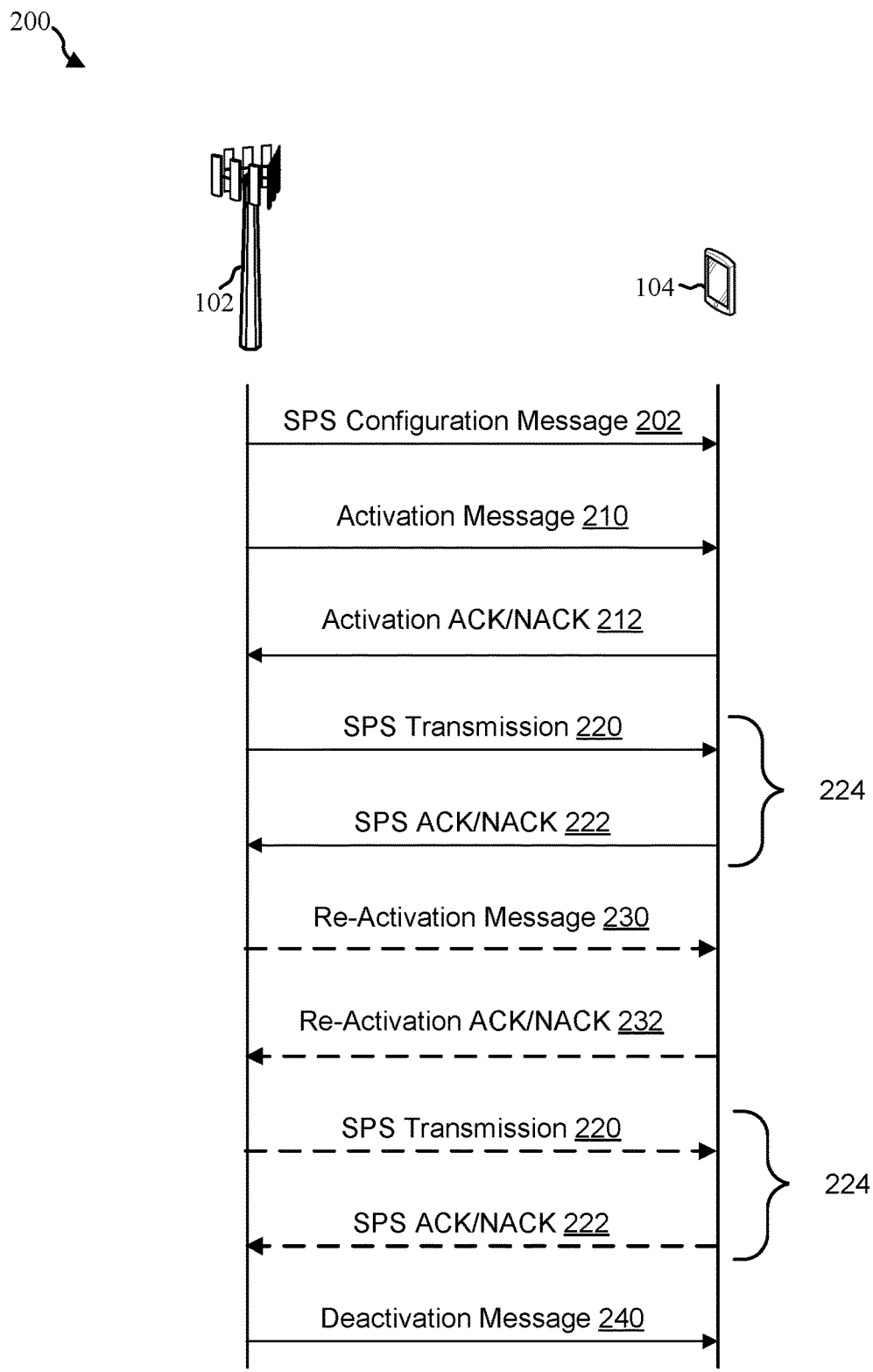
FIG. 2 is a call flow diagram of example communications for a semi-persistent scheduling (SPS) scheme, according to aspects of the present disclosure.

Referring to FIG. 2, a SPS scheme 200 for SPS transmissions using HARQ-ACK is illustrated. Based on the SPS scheme 200, the base station 102 may transmit and the UE 104 may receive an SPS configuration message 202 for configuring the UE 104 for SPS physical DL shared channel (PDSCH) resources. The SPS configuration message 202 may include information on SPS transmission timing and/or periodicity, indication of resources for the SPS transmissions, etc. In an example, the SPS configuration message 202 may be a radio resource control (RRC) message.

Subsequently, the base station 102 may transmit an activation message 210 to activate SPS PDSCH transmissions to the UE 104. Examples of the activation message 210 include a DCI message. The activation message 210 may include one or more parameters for the UE 104 to respond to the activation message 210 and to receive SPS transmissions 220. For example, the parameters may include one or more of a modulation and coding scheme (MCS), a DL transmission configuration indicator (TCI) state, a DL SPS time/frequency allocation, and/or offset values (e.g., K1 values). In an example, the offset values indicate a first offset time for an activation ACK/NACK 212 to be sent from a time of reception of the activation message 210 and a second offset time for an SPS ACK/NACK 222 to be sent from a time of reception of an SPS transmission 220. In an example, the first and second offset times may be the same or different. In an example, one or more of the parameters may be indicated by a physical UL control channel (PUCCH) resource indicator (PRI) of the activation message 210.

In response to the activation message 210, the UE 104 may transmit the activation ACK/NACK 212 based on the parameters indicated in the activation message 210. Accordingly, the activation ACK/NACK 212 may be dynamically indicated in the activation message 210. In particular, a PUCCH resource may be dynamically allocated for the activation ACK/NACK 206 based on the parameters indicated in the activation message 210.

Subsequent to the activation message 210, the base station 102 may transmit and the UE 104 may receive the SPS transmission 220 according to the information from the SPS configuration message 202 and the parameters indicated in the activation message 210. In response, to the SPS transmission 220, the UE 104 may transmit and the base station 102 may receive the SPS ACK/NACK 222 based on semi-static configurations from the SPS configuration message 202. In this manner, the base station 102 may know what resources to monitor and when to monitor these resources for reception of the SPS ACK/NACK 222.

Subsequent to the SPS ACK/NACK 222, an SPS communication cycle 224 may continue between the base station 102 and the UE 104. The SPS communication cycle 224 may include any number of SPS transmissions 220 (e.g., updated DL scheduling information communicated between the base station 102 and the UE 104) and SPS ACK/NACKs 222 (e.g., ACK/NACK the updated DL scheduling transmissions). The SPS communication cycle 224 may continue until a deactivation message 240 to deactivate subsequent SPS transmissions 208 is transmitted by the base station 102 and received by the UE 104 or a re-activation message 230 is transmitted by the base station 102 and received by the UE 104.

The re-activation message 230 may include indications for updates to the one or more parameters received in the activation message 210. For example, the indications in the re-activation message 230 may include updated information for the MCS, the DL TCI state, the DL SPS time/frequency allocation, and/or one or more of the offset values (e.g., K1 values), described herein.

In response to the re-activation message 230, the UE 104 may transmit a re-activation ACK/NACK 232 based on the parameters indicated in the re-activation message 230. Accordingly, the re-activation ACK/NACK 232 may be dynamically indicated in the re-activation message 230, as described herein. Subsequent to the re-activation message 230, the base station 102 may transmit and the UE 104 may receive SPS communications 224 according to the information from the SPS configuration message 202 and the updated parameters indicated in the re-activation message 230.

The SPS communication cycle 224 may continue until a deactivation message 240 is transmitted by the base station 102 and received by the UE 104 or a subsequent re-activation message is transmitted by the base station 102 and received by the UE 104.

As described herein, conventional SPS techniques do not provide an ACK/NACK for the activation/reactivation messages. Conventional SPS techniques also use the PUCCH resource (e.g., dynamic resource, resource A, or first resource) after a first SPS transmission to ACK/NACK for an activation message (or re-activation message) which is different from the PUCCH resource (semi-static resource, resource B, or second resource) after subsequent SPS transmissions to ACK/NACK for remaining SPS transmissions. Use of the different resources and implicit indications of ACK/NACK may add time delay into the services used by 5G NR technologies.

In comparison to conventional SPS techniques, implementations of the present disclosure allow services (e.g., URLLC) used by 5G NR technologies to receive explicit HARQ-ACK feedback for SPS. In particular, use of the HARQ-ACKs (e.g., activation ACK/NACK 212 or re-activation ACK/NACK 232) for ACK/NACK of activation/reactivation of SPS and the HARQ-ACKs (e.g., SPS ACK/NACK 222) for ACK/NACK of the SPS transmissions provides two separate HARQ-ACKs. Use of the implementations may provide clear indications of the ACK/NACKs of activation/reactivation messages 210/230 and SPS transmissions 220 and avoid time delay, introduced by implicit indications of SPS transmissions performed, added by conventional SPS techniques.

Figure 3:
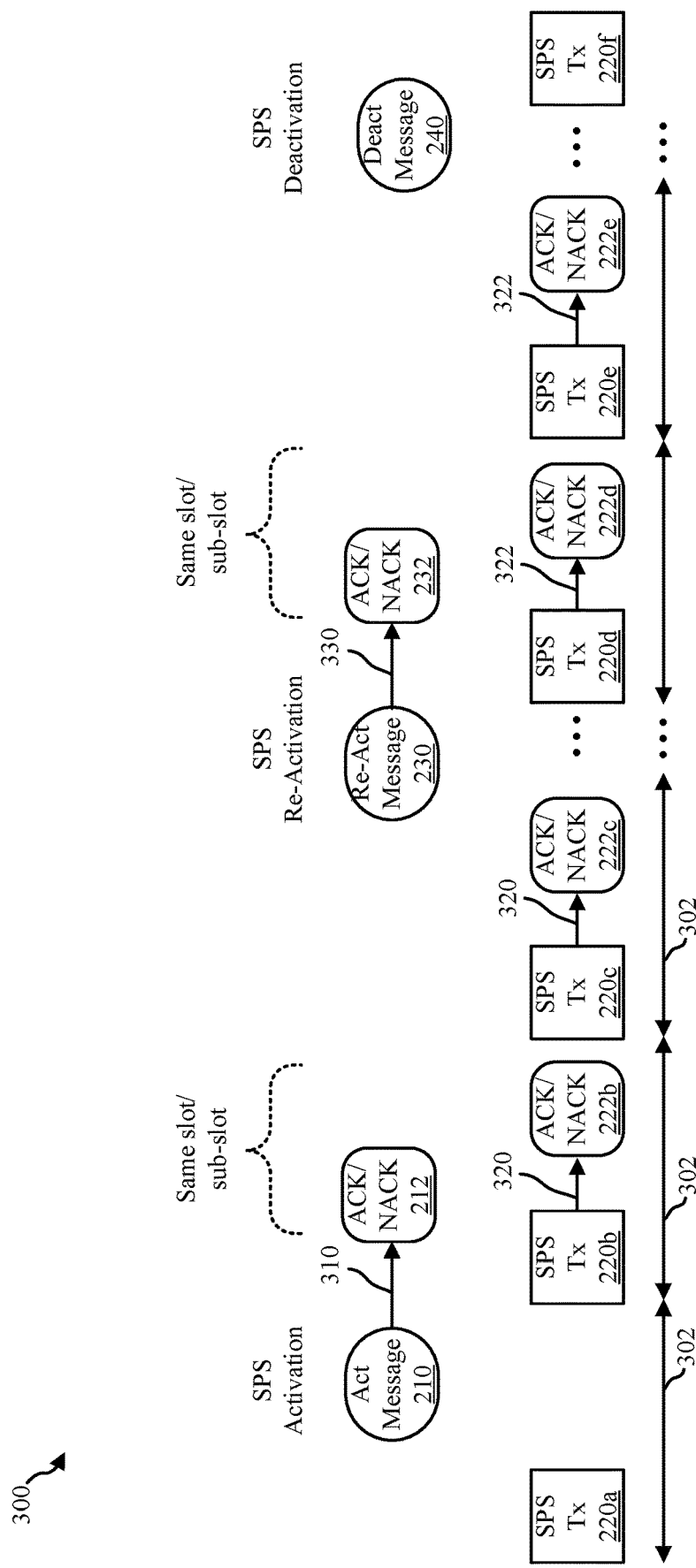
FIG. 3 includes a block diagram of a conceptual example of an SPS scheme, according to aspects of the present disclosure.

Referring to FIG. 3, a conceptual block diagram of an SPS scheme 300 for SPS transmissions using HARQ-ACK is illustrated. As described, the base station 102 may transmit the SPS transmissions (or SPS Tx) 220a-220f (cumulatively SPS transmissions 220) according to a certain periodicity 302. Each of the SPS transmissions 220 may include DL scheduling information for UEs 104. As described herein, the base station 102 may configure the SPS transmissions 220 on the UE 104 through the SPS configuration message 202.

The base station 102 may also transmit the activation message 210 to activate SPS on the UE 104. The activation message 210 may include parameters, including the resource information and the offset values 310 and 320. In this example, the offset value 310 indicates a time from the reception of the activation message 210 to transmission of an activation ACK/NACK (e.g., ACK/NACK 212), and the offset value 320 indicates a time from the reception of a first SPS transmission (e.g., SPS Tx 220b) that is subsequent to the activation message 210 to transmission of an SPS ACK/NACK (e.g., ACK/NACK 222b).

The UE 104 may transmit the ACK/NACK 212 according to the parameters indicated by the activation message 210. Once the SPS Tx 220b (i.e., first SPS transmission after the UE 104 receives activation message 210) is received, the UE 104 may also transmit the ACK/NACK 222b to acknowledge reception of the SPS Tx 220b. The ACK NACK 22b is transmitted according to one or more parameters (e.g., offset value 320) indicated by the activation message 210 and one or more parameters (e.g., resource information) indicated by the SPS configuration message 202.

SPS communications (e.g., SPS Tx 220c and ACK/NACK 222c may continue between the base station 102 and the UE 104 according to the parameters from the SPS configuration message 202 and the activation message 210.

At some point in time, the base station 102 may update any of the SPS transmission parameters by transmitting the re-activation message 230. Aside from the SPS transmission parameters, the re-activation message 230 may include new offset values 330 and 322. One or more of these values may be the same or different from the previous offset values 310 and 320.

In response to the re-activation message 230, the UE 104 may transmit the ACK/NACK 232 according to the parameters indicated by the activation message 230. Once the SPS Tx 220d (i.e., first SPS transmission after the UE 104 receives activation message 230) is received, the UE 104 may also transmit the ACK/NACK 222d to acknowledge reception of the SPS Tx 220d. The ACK NACK 222d is transmitted according to one or more parameters (e.g., offset value 322) indicated by the activation message 230 and one or more parameters (e.g., resource information) indicated by the SPS configuration message 202.

SPS communications (e.g., SPS Tx 220e and ACK/NACK 222e) may continue between the base station 102 and the UE 104 according to the updated parameters.

At some point in time, the base station 102 may deactivate SPS on the UE 104 by transmitting the deactivation message 240, as described herein. In an example, the UE 104 may respond to the deactivation message 240 with an ACK/NACK (not shown) or may merely stop ACK/NACKs with the base station 102.

In some aspects, the UE 104 may only transmit one HARQ-ACK codebook in a single slot/sub-slot. Therefore, in the case where an ACK/NACK for an activation/re-activation message and an ACK/NACK for the first SPS transmission after the activation/re-activation message fall into a same slot/sub-slot, the UE 104 may merge (or concatenate) the ACK/NACK for the activation/re-activation message with the ACK/NACK for the first SPS transmission after the activation/reactivation message into a single codebook (e.g., codebook A) and transmit the codebook based on a PUCCH resource indicated by the activation/re-activation-message. For example, the PUCCH resource may be indicated in a PRI of the activation/re-activation message.

In an example, the merging of the two ACK/NACKs may include the ACK/NACK for activation/re-activation message on, for example, a most significant bit (MSB) or a least significant bit, followed by the ACK/NACK for the first SPS transmission after the activation/reactivation message, or vice versa.

In another example, if the codebook A (e.g., merged codebook) overlaps with another HARQ-ACK codebook (e.g., codebook B) for dynamic scheduled PDSCH, the codebook A may be merged into the codebook B. Further, a counter for a DL assignment index (DAI) in the activation/reactivation message may interpret or map the ACK/NACKs to merge a total number of bits of the codebook A (e.g., 2 bits) into the codebook B.

Figure 4:
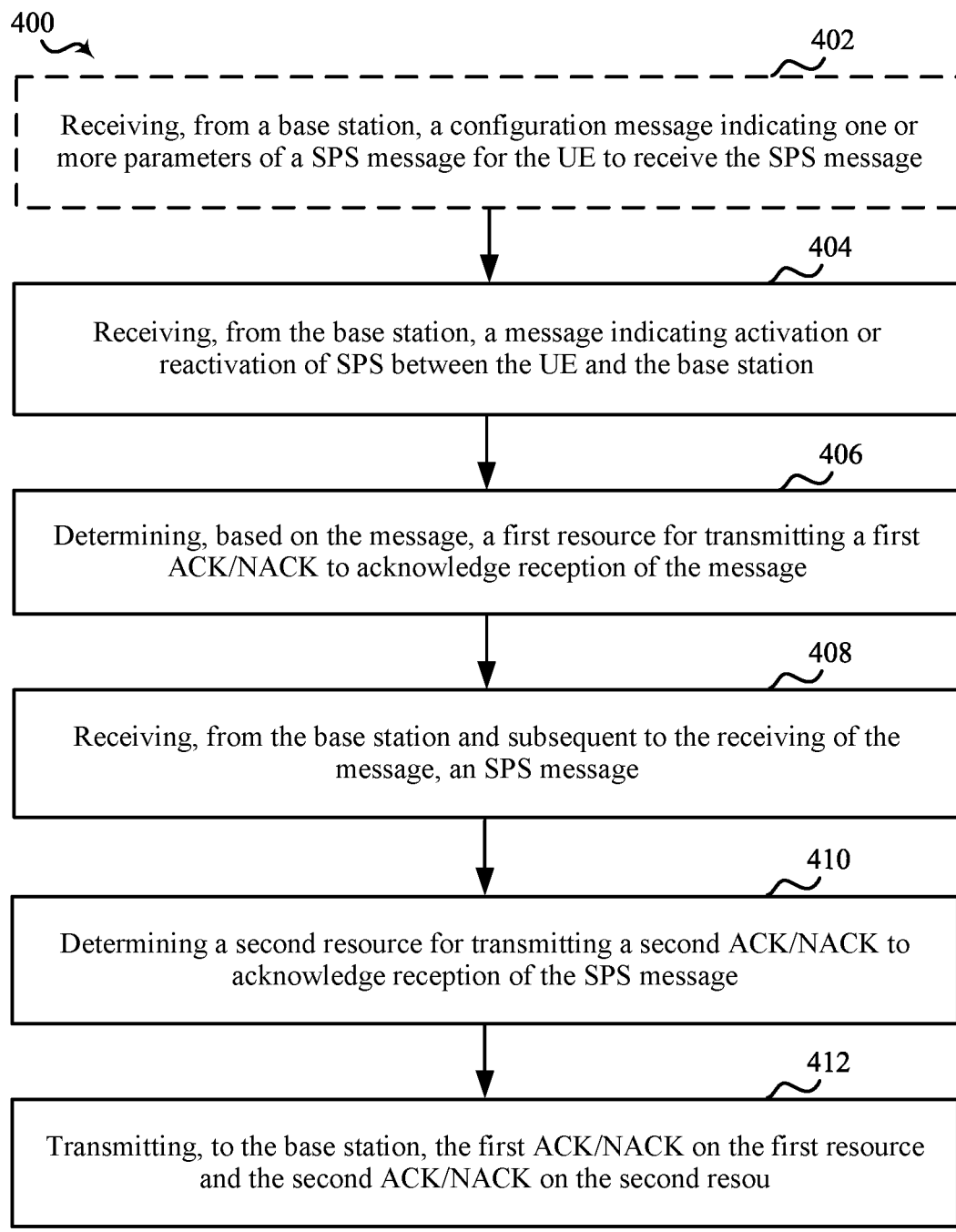
FIG. 4 is a flowchart of an example method of wireless communications by a user equipment (UE) of FIG. 1, according to aspects of the present disclosure.

Referring to FIG. 4, an example method of wireless communications is disclosed. The method 400 may be performed by the UE 104 along with any of the components (see e.g., FIG. 5) of the UE 104. For example, the method 400, may be performed by one or more of a processor 512, a transceiver 502, the modem 144, the ACK/NACK component 146, and/or one or more additional components/subcomponents of the UE 104.

Turning to FIG. 4, at 402, the method 400 may optionally include receiving, from a base station, a configuration message indicating one or more parameters of an SPS message for the UE to receive the SPS message. For example, one or more of the processor 512, the transceiver 502, the modem 144, the ACK/NACK component 146, and/or one or more components/subcomponents of the UE 104 may be configured to receive, from the base station 102, the SPS configuration message 202 (e.g., configuration message) indicating one or more parameters of an SPS transmission 220 (e.g., SPS message) for the UE 104 to receive the SPS transmission. Thus, the processor 512, the transceiver 502, the modem 144, the ACK/NACK component 146, and/or one or more components/subcomponents of the UE 104 may define the means for receiving, from the base station 102, the SPS configuration message 202 (e.g., configuration message) indicating one or more parameters of an SPS transmission 220 (e.g., SPS message) for the UE 104 to receive the SPS transmission. In an example, the configuration message is an RRC message.

In an example, one or more of the processor 512, the transceiver 502, the modem 144, the ACK/NACK component 146, and/or one or more components/subcomponents of the UE 104 may monitor, in response to the configuration message, communications from the base station 102 to receive the SPS message based on the one or more parameters of the SPS message.

At 404, the method 400 may include receiving, from a base station, a message indicating activation or reactivation of SPS between the UE and the base station. For example, one or more of the processor 512, the transceiver 502, the modem 144, the ACK/NACK component 146, and/or one or more components/subcomponents of the UE 104 may be configured to receive, from the base station 102, the activation message 210 indicating activation or reactivation of SPS between the UE 104 and the base station 102. Thus, the processor 512, the transceiver 502, the modem 144, the ACK/NACK component 146, and/or one or more components/subcomponents of the UE 104 may define the means for receiving, from the base station 102, the activation message 210 indicating activation or reactivation of SPS between the UE 104 and the base station 102.

In an example, the message may be a DCI message. In an example, the message may include one or more parameters for the activation or the reactivation of the SPS. In an example, the one or more parameters are indicated by the message in a PRI In an example, the one or more parameters includes a modulation and coding scheme for SPS transmissions, a DL SPS time and frequency allocation, a first offset value for the first ACK/NACK, or a second offset value for the second ACK/NACK. In an example, the second offset value may be a different value or a same value as the first offset value.

At 406, the method 400 may also include determining, based on the message, a first resource for transmitting a first ACK/NACK to acknowledge reception of the message. For example, one or more of the processor 512, the transceiver 502, the modem 144, the ACK/NACK component 146, and/or one or more components/subcomponents of the UE 104 may be configured to determine, based on the activation message 210, a first resource for transmitting the activation ACK/NACK 212 (e.g., first ACK/NACK) to acknowledge reception of the activation message 210. Thus, the processor 512, the transceiver 502, the modem 144, the ACK/NACK component 146, and/or one or more components/subcomponents of the UE 104 may define the means for determining, based on the activation message 210, a first resource for transmitting the activation ACK/NACK 212 (e.g., first ACK/NACK) to acknowledge reception of the activation message 210. In an example, the first resource may be determined based on one or more parameters (e.g., PRI) indicated by from the message (e.g., DCI message).

At 408, the method 400 may include receiving, from the base station and subsequent to the receiving of the message, an SPS message. For example, one or more of the processor 512, the transceiver 502, the modem 144, the ACK/NACK component 146, and/or one or more components/subcomponents of the UE 104 may be configured to receive, from the base station 102 and subsequent to the receiving of the activation message 210, the SPS transmission 220*b* (e.g., SPS message). Thus, the processor 512, the transceiver 502, the modem 144, the ACK/NACK component 146, and/or one or more components/subcomponents of the UE 104 may define the means for receiving, from the base station 102 and subsequent to the receiving of the activation message 210, the SPS transmission 220*b*. In an example, the UE 104 may monitor communications with the base station 102 to receive the SPS message. In particular, the UE 104 may receive an indication (e.g., via RRC message) indicating the resource to monitor for the SPS message.

At 410, the method 400 may include selecting a second resource for transmitting a second ACK/NACK to acknowledge reception of the SPS message. For example, one or more of the processor 512, the transceiver 502, the modem 144, the ACK/NACK component 146, and/or one or more components/subcomponents of the UE 104 may be configured to select a second resource for transmitting the SPS ACK/NACK 22*b* (e.g., second ACK/NACK) to acknowledge reception of the SPS transmission 220*b* (e.g., SPS message). Thus, the processor 512, the transceiver 502, the modem 144, the ACK/NACK component 146, and/or one or more components/subcomponents of the UE 104 may define the means for selecting a second resource for transmitting the SPS ACK/NACK 22*b* (e.g., second ACK/NACK) to acknowledge reception of the SPS transmission 220*b* (e.g., SPS message). In an example, the second resource may be selected based on one or more parameters (e.g., PRI) indicated by the SPS configuration message (e.g., RRC message).

At 412, the method 400 may include transmitting, to the base station, the first ACK/NACK on the first resource and the second ACK/NACK on the second resource. For example, one or more of the processor 512, the transceiver 502, the modem 144, the ACK/NACK component 146, and/or one or more components/subcomponents of the UE 104 may be configured to transmit, to the base station 102, the activation ACK/NACK 212 (e.g., first ACK/NACK) on the first resource and the SMS ACK/NACK 222*b* (e.g., second ACK/NACK) on the second resource. Thus, the processor 512, the transceiver 502, the modem 144, the ACK/NACK component 146, and/or one or more components/subcomponents of the UE 104 may define the means for transmitting, to the base station 102, the activation ACK/NACK 212 (e.g., first ACK/NACK) on the first resource and the SMS ACK/NACK 222*b* (e.g., second ACK/NACK) on the second resource.

In an example, the method 400 may also include selecting the first resource and the second resource are within a same slot or a same sub-slot, and merging the first ACK/NACK and the second ACK/NACK into a single codebook in response to the selecting of the first resource and the second resource are within the same slot or the same sub-slot, wherein the second resource is a same resource as the first resource. For example, one or more of the processor 512, the modem 144, the ACK/NACK component 146, and/or one or more components/subcomponents of the UE 104 may be configured to determine the first resource and the second resource are within a same slot or a same sub-slot, and merge the first ACK/NACK and the second ACK/NACK into a single codebook in response to the determining of the first resource and the second resource are within the same slot or the same sub-slot, wherein the second resource is a same resource as the first resource. Thus, the processor 512, the transceiver 502, the modem 144, the ACK/NACK component 146, and/or one or more components/subcomponents of the UE 104 may define the means for determining the first resource and the second resource are within a same slot or a same sub-slot, and the means for merging the first ACK/NACK and the second ACK/NACK into a single codebook in response to the determining of the first resource and the second resource are within the same slot or the same sub-slot, wherein the second resource is a same resource as the first resource.

In an example, the method 400 may also include determining an overlap exists between the single codebook and a second codebook for dynamic scheduled DL messages and merging the single codebook into the second codebook in response to the determining the overlap exists. For example, one or more of the processor 512, the modem 144, the ACK/NACK component 146, and/or one or more components/subcomponents of the UE 104 may be configured to determine an overlap exists between the single codebook and a second codebook for dynamic scheduled DL messages and merge the single codebook into the second codebook in response to the determining the overlap exists. Thus, the processor 512, the transceiver 502, the modem 144, the ACK/NACK component 146, and/or one or more components/subcomponents of the UE 104 may define the means for determining an overlap exists between the single codebook and a second codebook for dynamic scheduled DL messages and the means for merging the single codebook into the second codebook in response to the determining the overlap exists.

It should be noted that while the method 400 is described using the activation message 210, the SPS transmission 220b, the activation ACK/NACK 212, and the SPS ACK/NACK 222b, one skilled in the art would recognize that these same operations may be applied to other messages and ACK/NACK operations such as the re-activation message 230, the SPS transmission 220d, the re-activation ACK/NACK 232, and the SPS ACK/NACK 222d.

Figure 5:
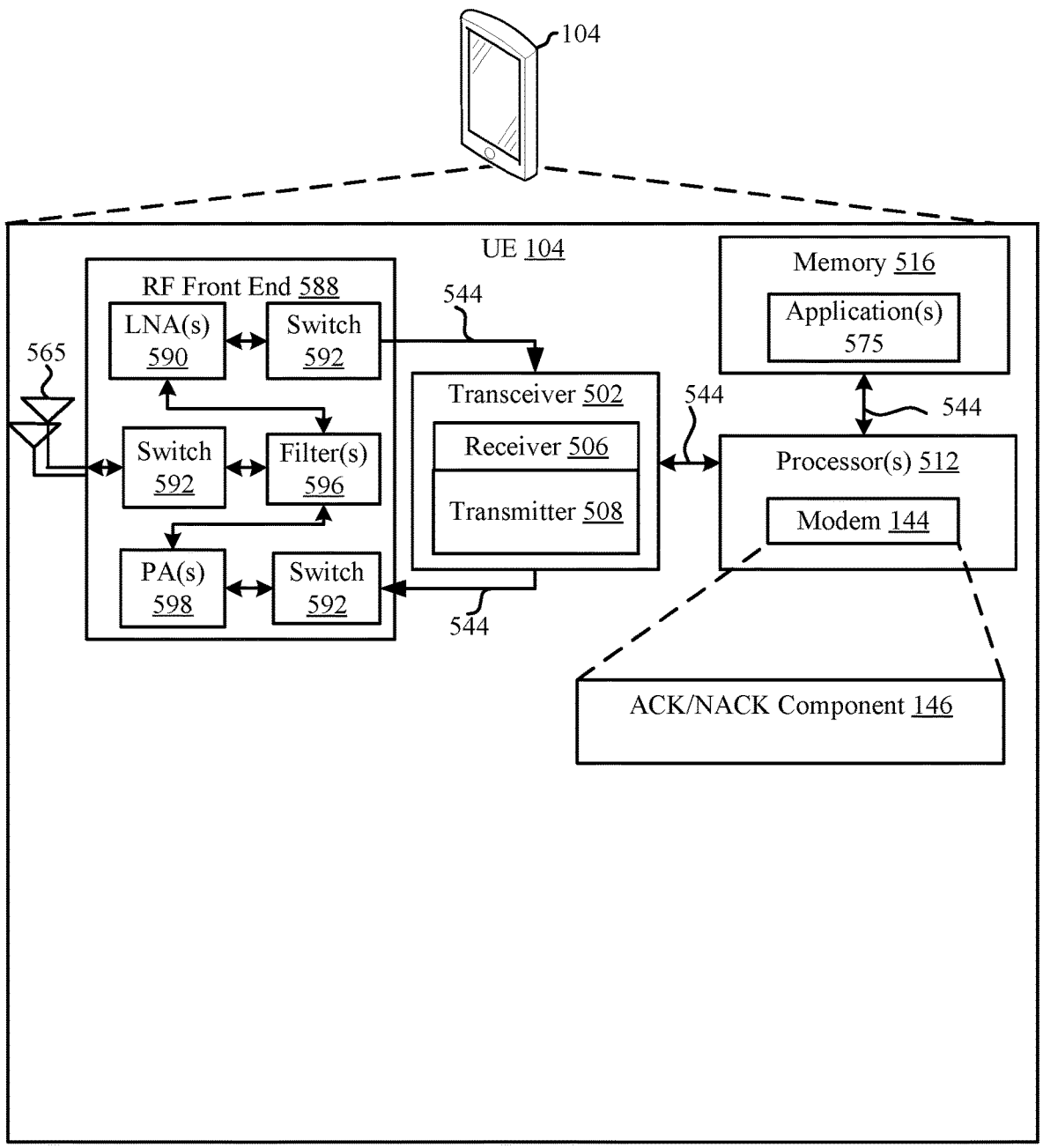
FIG. 5 is a schematic diagram of an example of the UE of FIG. 1, according to aspects of the present disclosure.

Referring to FIG. 5, one example of an implementation of the UE 104 may include a variety of components, some of which have already been described above, but including components such as one or more processors 512, memory 516, and transceiver 502 in communication via one or more buses 544, which may operate in conjunction with the modem 144 to enable one or more of the functions of the method 400 described herein. The one or more processors 512, modem 144, memory 516, the transceiver 502, RF front end 588 and one or more antennas 565, may be configured to support voice and/or data calls (simultaneously or non-simultaneously) in one or more radio access technologies.

In an aspect, the one or more processors 512 may include the modem 144 that uses one or more modem processors. The various functions related to the ACK/NACK component 146 may be included in the modem 144 and/or the processors 512 and, in an aspect, may be executed by a single processor, while in other aspects, different ones of the functions may be executed by a combination of two or more different processors. For example, in an aspect, the one or more processors 512 may include any one or any combination of a modem processor, or a baseband processor, or a digital signal processor, or a transmit processor, or a receiver processor, or a transceiver processor associated with the transceiver 502. In other aspects, some of the features of the one or more processors 512 and/or the modem 144 may be performed by the transceiver 502.

Also, the memory 516 may be configured to store data used herein and/or local versions of applications 575 or the ACK/NACK component 146 and/or one or more of its subcomponents being executed by the at least one processors 512. The memory 516 may include any type of computer-readable medium usable by a computer or the at least one processor 512, such as random access memory (RAM), read only memory (ROM), tapes, magnetic discs, optical discs, volatile memory, non-volatile memory, and any combination thereof. In an aspect, for example, the memory 516 may be a non-transitory computer-readable storage medium that stores one or more computer-executable codes defining the ACK/NACK component 146 and/or one or more of its subcomponents, and/or data associated therewith, when the UE 104 is operating the at least one processor 512 to execute the ACK/NACK component 146 and/or one or more of its subcomponents.

The transceiver 502 may include at least one receiver 506 and at least one transmitter 508. The receiver 506 may include hardware, firmware, and/or software code executable by a processor for receiving data, the code comprising instructions and being stored in a memory (e.g., computer-readable medium). The receiver 506 may be, for example, a radio frequency (RF) receiver. In an aspect, the receiver 506 may receive signals transmitted by at least one of the base station 102 or another UE 104. Additionally, the receiver 506 may process such received signals, and also may obtain measurements of the signals, such as, but not limited to, Ec/Io, SNR, RSRP, RSSI, etc. The transmitter 508 may include hardware, firmware, and/or software code executable by a processor for transmitting data, the code comprising instructions and being stored in a memory (e.g., computer-readable medium). A suitable example of the transmitter 508 may include, but is not limited to, an RF transmitter. The transceiver 502, receiver 506, and/or transmitter 508 may be configured to operate in mmW frequencies and/or near mmW frequencies.

Moreover, in an aspect, the UE 104 may include the RF front end 588, which may operate in communication with one or more antennas 565 and the transceiver 502 for receiving and transmitting radio transmissions, for example, wireless communications received by the UE 104 or wireless transmissions transmitted by the UE 104. The RF front end 588 may be connected to the one or more antennas 565 and may include one or more low-noise amplifiers (LNAs) 590, one or more switches 592, one or more power amplifiers (PAs) 598, and one or more filters 596 for transmitting and receiving RF signals.

In an aspect, the LNA 590 may amplify a received signal at a desired output level. In an aspect, each of the LNAs 590 may have a specified minimum and maximum gain values. In an aspect, the RF front end 588 may use the one or more switches 592 to select a particular LNA 590 and its specified gain value based on a desired gain value for a particular application.

The one or more PA(s) 598 may be used by the RF front end 588 to amplify a signal for an RF output at a desired output power level. In an aspect, each of the PAs 598 may have specified minimum and maximum gain values. In an aspect, the RF front end 588 may use the one or more switches 592 to select a particular PA 598 and its specified gain value based on a desired gain value for a particular application.

Also, for example, the one or more filters 596 may be used by the RF front end 588 to filter a received signal to obtain an input RF signal. Similarly, in an aspect, for example, a respective filter 596 may be used to filter an output from a respective PA 598 to produce an output signal for transmission. In an aspect, each of the filters 596 may be connected to a specific LNA 590 and/or PA 598. In an aspect, the RF front end 588 may use the one or more switches 592 to select a transmit or receive path using a specified filter 596, LNA 590, and/or PA 598, based on a configuration as specified by the transceiver 502 and/or the processor 512.

As such, the transceiver 502 may be configured to transmit and receive wireless signals through the one or more antennas 565 via the RF front end 588. In an aspect, the transceiver 502 may be tuned to operate at specified frequencies such that the UE 104 may communicate with, for example, base station 102, one or more cells associated with one or more of the base stations 102, or one or more other UEs 104. In an aspect, for example, the modem 144 may configure the transceiver 502 to operate at a specified frequency and power level based on the UE 104 configuration of the UE 104 and the communication protocol used by the modem 144.

In an aspect, the modem 144 may be a multiband-multimode modem, which may process digital data and communicate with the transceiver 502 such that the digital data is sent and received using the transceiver 502. In an aspect, the modem 144 may be multiband and be configured to support multiple frequency bands for a specific communications protocol. In an aspect, the modem 144 may be multimode and be configured to support multiple operating networks and communications protocols. In an aspect, the modem 144 may control one or more components of the UE 104 (e.g., RF front end 588, transceiver 502) to enable transmission and/or reception of signals from the network based on a specified modem configuration. In an aspect, the modem configuration may be based on the mode of the modem 144 and the frequency band in use. In another aspect, the modem configuration may be based on UE configuration information associated with the UE 104 as provided by the network during cell selection and/or cell reselection.

Figure 6:
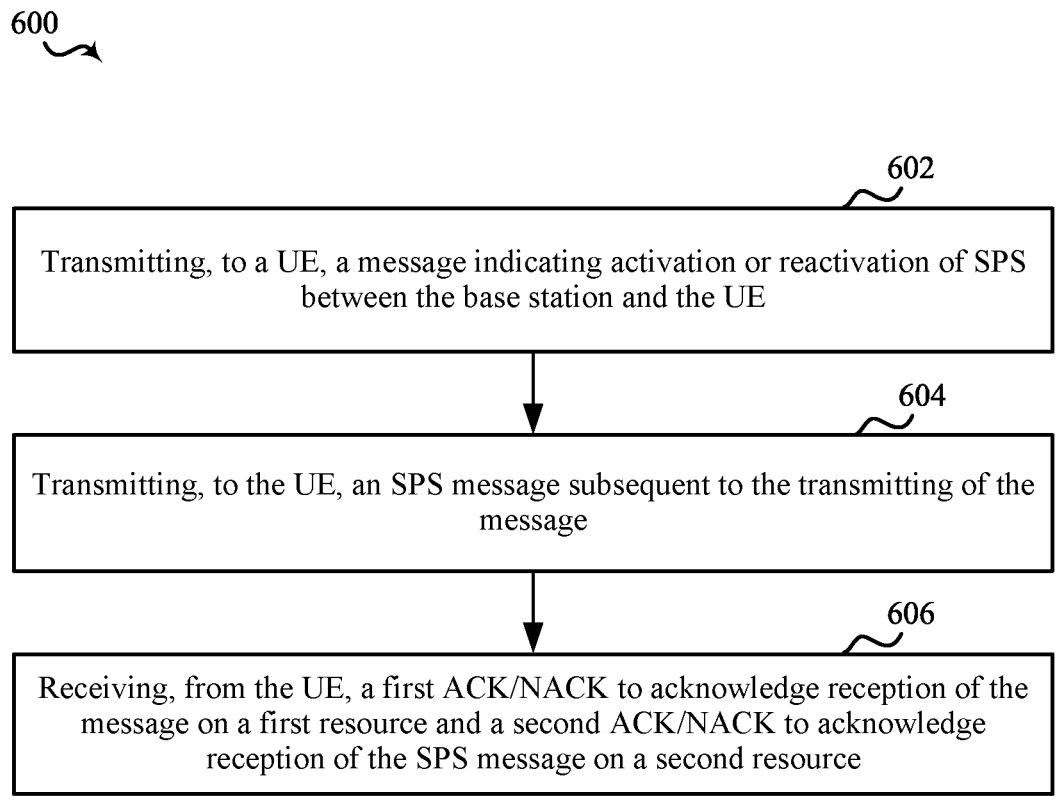
FIG. 6 is a flowchart of an example method of wireless communications by the base station of FIG. 1, according to aspects of the present disclosure.

Referring to FIG. 6, another example method of wireless communications is disclosed. The method 600 may be performed by the base station 102 along with any of the components (see e.g., FIG. 7) of the base station 102. For example, the method 600, may be performed by one or more of a processor 712, a transceiver 702, the modem 140, the SPS component 142, and/or one or more additional components/subcomponents of the base station 102.

Turning to FIG. 6, at 602, the method 600 may include transmitting, to a UE, a message indicating activation or reactivation of SPS between the base station and the UE. For example, one or more of the processor 712, the transceiver 702, the modem 140, the SPS component 142 and/or one or more components/subcomponents of the base station 102 may be configured to transmit, to the UE 104, the activation message 210 (e.g., message) indicating activation or reactivation of SPS between the base station 102 and the UE 104. Thus, the processor 712, the transceiver 702, the modem 140, the SPS component 142, and/or one or more components/subcomponents of the base station 102 may define the means for transmitting, to the UE 104, the activation message 210 (e.g., message) indicating activation or reactivation of SPS between the base station 102 and the UE 104.

At 604, the method 600 may also include transmitting, to the UE, an SPS message subsequent to the transmitting of the DCI message. For example, one or more of the processor 712, the transceiver 702, the modem 140, the SPS component 142 and/or one or more components/subcomponents of the base station 102 may be configured to transmit, to the UE 104, the SPS transmission 220 (e.g., SPS message) subsequent to the transmitting of the activation message 210 (e.g., message). Thus, the processor 712, the transceiver 702, the modem 140, the SPS component 142, and/or one or more components/subcomponents of the base station 102 may define the means for transmitting, to the UE 104, the SPS transmission 220 (e.g., SPS message) subsequent to the transmitting of the activation message 210 (e.g., message).

At 606, the method 600 may include receiving, from the UE, a first ACK/NACK to acknowledge reception of the message on a first resource and a second ACK/NACK to acknowledge reception of the SPS message on a second resource. For example, one or more of the processor 712, the transceiver 702, the modem 140, the SPS component 142 and/or one or more components/subcomponents of the base station 102 may be configured to receive, from the UE 104, the activation ACK/NACK 212 (e.g., first ACK/NACK) to acknowledge reception of the activation message 210 (e.g., message) on a first resource and an SMS ACK/NACK 222 (e.g., second ACK/NACK) to acknowledge reception of the SPS transmission 220 (e.g., SPS message) on a second resource. Thus, the processor 712, the transceiver 702, the modem 140, the SPS component 142, and/or one or more components/subcomponents of the base station 102 may define the means for receiving, from the UE 104, the activation ACK/NACK 212 (e.g., first ACK/NACK) to acknowledge reception of the activation message 210 (e.g., message) on a first resource and an SMS ACK/NACK 222 (e.g., second ACK/NACK) to acknowledge reception of the SPS transmission 220 (e.g., SPS message) on a second resource.

It should be noted that while the method 600 is described using the activation message 210, the SPS transmission 220b, the activation ACK/NACK 212, and the SPS ACK/NACK 222b, one skilled in the art would recognize that these same operations may be applied to other messages and ACK/NACK operations such as the re-activation message 230, the SPS transmission 220d, the re-activation ACK/NACK 232, and the SPS ACK/NACK 222d.

Figure 7:
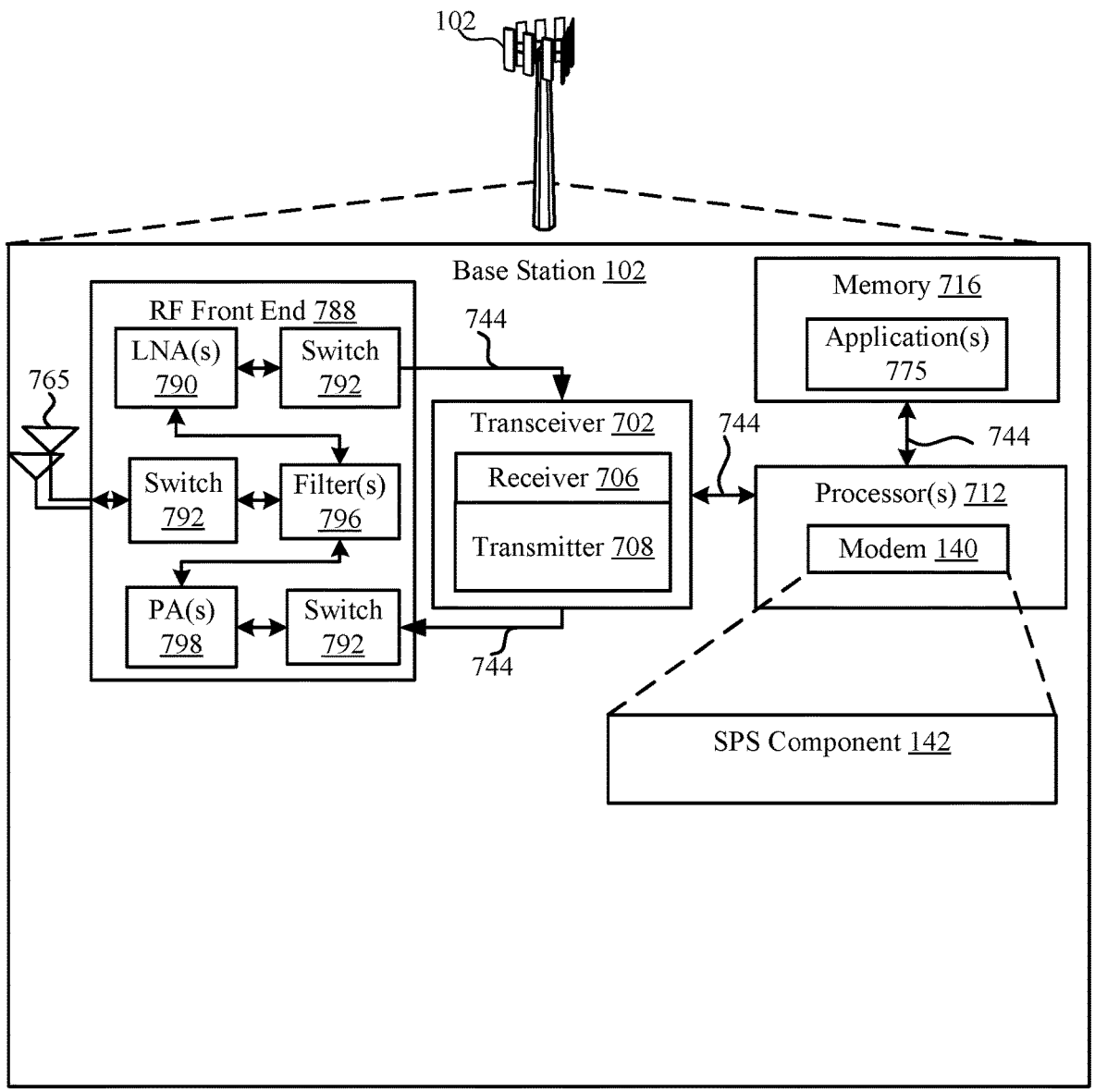
FIG. 7 is a schematic diagram of an example of the base station of FIG. 1, according to aspects of the present disclosure.

Referring to FIG. 7, one example of an implementation of the base station 102 may include a variety of components, some of which have already been described above, but including components such as one or more processors 712, memory 716 and transceiver 702 in communication via one or more buses 744, which may operate in conjunction with the modem 140 and the SPS component 142 to enable one or more of the functions of the method 600 described herein.

The transceiver 702, receiver 706, transmitter 708, one or more processors 712, memory 716, applications 775, buses 744, RF front end 788, LNAs 790, switches 792, filters 796, PAs 798, and one or more antennas 765 may be the same as or similar to the corresponding components of the UE 104, as described above, but configured or otherwise programmed for base station operations as opposed to UE operations.

SOME FURTHER EXAMPLES

An example method of wireless communications by a user equipment (UE), comprising: receiving, from a base station, a message indicating activation or reactivation of semi-persistent scheduling (SPS) between the UE and the base station; selecting, based on the message, a first resource for transmitting a first acknowledgement/negative-acknowledgement (ACK/NACK) to acknowledge reception of the message; receiving, from the base station and subsequent to the receiving of the message, an SPS message; selecting a second resource for transmitting a second ACK/NACK to acknowledge reception of the SPS message; and transmitting, to the base station, the first ACK/NACK on the first resource and the second ACK/NACK on the second resource.

The above example method, wherein the message comprises one or more parameters for the activation or the reactivation of the SPS.

One or more of the above-example methods, wherein the one or more parameters are indicated by the message in a PRI.

One or more of the above-example methods, wherein the one or more parameters includes a modulation and coding scheme for SPS transmissions, a DL SPS time and frequency allocation, a first offset value for the first ACK/NACK, or a second offset value for the second ACK/NACK.

One or more of the above-example methods, wherein the second offset value is different from the first offset value.

One or more of the above-example methods, wherein the message is a DCI message.

One or more of the above-example methods, further comprising: receiving, from the base station, a configuration message indicating one or more parameters of the SPS message for the UE to receive the SPS message; and monitoring, in response to the configuration message, communications from the base station to receive the SPS message based on the one or more parameters of the SPS message.

One or more of the above-example methods, wherein the configuration message is a radio resource control (RRC) message.

One or more of the above-example methods, further comprising: determining the first resource and the second resource are within a same slot or a same sub-slot; and merging the first ACK/NACK and the second ACK/NACK into a single codebook in response to the determining of the first resource and the second resource are within the same slot or the same sub-slot, wherein the second resource is a same resource as the first resource.

One or more of the above-example methods, further comprising: determining an overlap exists between the single codebook and a second codebook for dynamic scheduled DL messages; and merging the single codebook into the second codebook in response to the determining the overlap exists.

An example apparatus (e.g., UE) comprising means for wireless communication, means for storing instructions and data, and means for performing all or part of one or more of the above example methods.

An example computer-readable medium storing computer executable code, comprising code to: perform all or part of one or more of the above example methods.

An example UE, comprising: a memory storing instructions; and one or more processors coupled with the memory and configured to: receive, from a base station, a message indicating activation or reactivation of SPS between the UE and the base station; select, based on the message, a first resource for transmitting a first ACK/NACK to acknowledge reception of the message; receive, from the base station and subsequent to the receiving of the message, an SPS message; select a second resource for transmitting a second ACK/NACK to acknowledge reception of the SPS message; and transmit, to the base station, the first ACK/NACK on the first resource and the second ACK/NACK on the second resource.

The above example UE wherein the message comprises one or more parameters for the activation or the reactivation of the SPS.

One or more of the above-example UEs, wherein the one or more parameters are indicated by the message in a PRI.

One or more of the above-example UEs, wherein the one or more parameters includes a modulation and coding scheme for SPS transmissions, a DL SPS time and frequency allocation, a first offset value for the first ACK/NACK, or a second offset value for the second ACK/NACK.

One or more of the above-example UEs, wherein the second offset value is different from the first offset value.

One or more of the above-example UEs, wherein the message is a DCI message.

One or more of the above-example UEs, wherein the one or more processors is further configured to: receive, from the base station, a configuration message indicating one or more parameters of the SPS message for the UE to receive the SPS message; and monitor, in response to the configuration message, communications from the base station to receive the SPS message based on the one or more parameters of the SPS message.

One or more of the above-example UEs, wherein the configuration message is an RRC message.

One or more of the above-example UEs, wherein the one or more processors is further configured to: determine the first resource and the second resource are within a same slot or a same sub-slot; and merge the first ACK/NACK and the second ACK/NACK into a single codebook in response to the determining of the first resource and the second resource are within the same slot or the same sub-slot, wherein the second resource is a same resource as the first resource.

One or more of the above-example UEs, wherein the one or more processors is further configured to: determine an overlap exists between the single codebook and a second codebook for dynamic scheduled DL messages; and merge the single codebook into the second codebook in response to the determining the overlap exists.

A second example method of wireless communications by a base station, comprising: transmitting, to a user equipment (UE), a message indicating activation or reactivation of semi-persistent scheduling (SPS) between the base station and the UE; transmitting, to the UE, an SPS message subsequent to the transmitting of the message; and receiving, from the UE, a first acknowledgement/negative-acknowledgement (ACK/NACK) to acknowledge reception of the message on a first resource and a second ACK/NACK to acknowledge reception of the SPS message on a second resource.

The above second example method, wherein the message comprises one or more parameters for the activation or the reactivation of the SPS.

One or more of the above-second example methods, wherein the one or more parameters are indicated by the message in a PRI.

One or more of the above-second example methods, wherein the one or more parameters includes a modulation and coding scheme for SPS transmissions, a DL SPS time and frequency allocation, a first offset value for the first ACK/NACK, or a second offset value for the second ACK/NACK.

One or more of the above-second example methods, wherein the second offset value is different from the first offset value.

One or more of the above-second example methods, wherein the messages is a DCI message.

One or more of the above-second example methods, further comprising: transmitting, to the UE, a configuration message indicating one or more parameters of the SPS message for the UE to monitor.

One or more of the above-second example methods, wherein the configuration message is a radio resource control (RRC) message.

An example apparatus (e.g., base station) comprising means for wireless communication, means for storing instructions and data, and means for performing all or part of one or more of the above-second example methods.

An example computer-readable medium storing computer executable code, comprising code to: perform all or part of one or more of the above-second example methods.

An example base station, comprising: a memory storing instructions; and one or more processors coupled with the memory and configured to: transmit, to a UE, a message indicating activation or reactivation of SPS between the base station and the UE; transmit, to the UE, an SPS message subsequent to the transmitting of the message; and receive, from the UE, a first ACK/NACK to acknowledge reception of the message on a first resource and a second ACK/NACK to acknowledge reception of the SPS message on a second resource.

The above example base station, wherein the message comprises one or more parameters for the activation or the reactivation of the SPS.

One or more of the above example base stations, wherein the one or more parameters are indicated by the message in a PRI.

One or more of the above example base stations, wherein the one or more parameters includes a modulation and coding scheme for SPS transmissions, a DL SPS time and frequency allocation, a first offset value for the first ACK/NACK, or a second offset value for the second ACK/NACK.

One or more of the above example base stations, wherein the second offset value is different from the first offset value.

One or more of the above example base stations, wherein the messages is a DCI message.

One or more of the above example base stations, wherein the one or more processors is further configured to: transmit, to the UE, a configuration message indicating one or more parameters of the SPS message for the UE to monitor.

One or more of the above example base stations, wherein the configuration message is an RRC message.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications by a user equipment (UE), comprising:
   receiving, from a base station, a configuration message indicating one or more parameters for the UE to receive a semi-persistent scheduling (SPS) message;
   receiving, from the base station, a message indicating activation or reactivation of SPS between the UE and the base station, wherein the message further indicates a first resource for transmitting a first acknowledgement/negative-acknowledgement (ACK/NACK) to acknowledge reception of the message, a first offset value for the first ACK/NACK, and a second offset value for a second ACK/NACK to acknowledge reception of the SPS message;
   transmitting, to the base station and based on the first offset value, the first ACK/NACK on the first resource to acknowledge reception of the message;
   receiving, from the base station and subsequent to the receiving of the message, the SPS message;
   determining, from the configuration message, a second resource for transmitting the second ACK/NACK to acknowledge reception of the SPS message; and
   transmitting, to the base station and based on the second offset value, the second ACK/NACK on the second resource.

2. The method of claim 1, wherein the message comprises one or more parameters for the activation or the reactivation of the SPS.

3. The method of claim 2, wherein the one or more parameters for the activation or the reactivation of the SPS further include a modulation and coding scheme for SPS transmissions, and a downlink (DL) SPS time and frequency allocation.

4. The method of claim 1, wherein the second offset value is different from the first offset value.

5. The method of claim 1, further comprising:
   monitoring, in response to the configuration message, communications from the base station to receive the SPS message based on the one or more parameters of the SPS message.

6. The method of claim 1, further comprising:
   determining the first resource and the second resource are within a same slot or a same sub-slot; and
   merging the first ACK/NACK and the second ACK/NACK into a single codebook in response to the determining of the first resource and the second resource are within the same slot or the same sub-slot, wherein the second resource is a same resource as the first resource.

7. The method of claim 6, further comprising:
   determining an overlap exists between the single codebook and a second codebook for dynamic scheduled downlink (DL) messages; and
   merging the single codebook into the second codebook in response to the determining the overlap exists.

8. A method of wireless communications by a base station, comprising:
   transmitting, to a user equipment (UE), a configuration message indicating one or more parameters for the UE to receive a semi-persistent scheduling (SPS) message;
   transmitting, to the UE, a message indicating activation or reactivation of SPS between the base station and the UE, wherein the message further indicates a first resource for transmitting a first acknowledgement/negative-acknowledgement (ACK/NACK) to acknowledge reception of the message, a first offset value for the first ACK/NACK, and a second offset value for a second ACK/NACK to acknowledge reception of the SPS message;
   receiving, from the UE and based on the first offset value, the first ACK/NACK on the first resource to acknowledge reception of the message;
   transmitting, to the UE, the SPS message subsequent to the transmitting of the message; and
   receiving, from the UE and based on the second offset value, the second ACK/NACK to acknowledge reception of the SPS message on a second resource, wherein the second resource is indicated by the configuration message.

9. The method of claim 8, wherein the message comprises one or more parameters for the activation or the reactivation of the SPS.

10. The method of claim 9, wherein the one or more parameters for the activation or the reactivation of the SPS include a modulation and coding scheme for SPS transmissions, and a DL SPS time and frequency allocation.

11. The method of claim 8, wherein the second offset value is different from the first offset value.

12. The method of claim 8, wherein the message is a downlink (DL) control information (DCI) message.

13. The method of claim 8, wherein the configuration message is a radio resource control (RRC) message.

14. A user equipment (UE), comprising:
   a memory storing instructions; and
   one or more processors coupled with the memory, wherein the one or more processors are configured to:
      receive, from a base station, a configuration message indicating one or more parameters for the UE to receive a semi-persistent scheduling (SPS) message;
      receive, from the base station, a message indicating activation or reactivation of SPS between the UE and the base station, wherein the message further indicates a first resource for transmitting a first acknowledgement/negative-acknowledgement (ACK/NACK) to acknowledge reception of the message, a first offset value for the first ACK/NACK, and a second offset value for a second ACK/NACK to acknowledge reception of the SPS message;
      transmit, to the base station and based on the first offset value, the first ACK/NACK on the first resource to acknowledge reception of the message;
      receive, from the base station and subsequent to the message being received, the SPS message;
      determine, from the configuration message, a second resource for transmitting the second ACK/NACK to acknowledge reception of the SPS message; and transmit, to the base station and based on the second offset value, the second ACK/NACK on the second resource.

15. The UE of claim 14, wherein the message comprises one or more parameters for the activation or the reactivation of the SPS.

16. The UE of claim 15, wherein the one or more parameters for the activation or the reactivation of the SPS include a modulation and coding scheme for SPS transmissions, and a downlink (DL) SPS time and frequency allocation.

17. The UE of claim 14, wherein the second offset value is different from the first offset value.

18. The UE of claim 14, wherein the one or more processors are further configured to:
monitor, in response to the configuration message, communications from the base station to receive the SPS message based on the one or more parameters of the SPS message.

19. The UE of claim 14, wherein the one or more processors are further configured to:
determine the first resource and the second resource are within a same slot or a same sub-slot; and
merge the first ACK/NACK and the second ACK/NACK into a single codebook in response to determining the first resource and the second resource are within the same slot or the same sub-slot,
wherein the second resource is a same resource as the first resource.

20. The UE of claim 19, wherein the one or more processors are further configured to:
determine an overlap exists between the single codebook and a second codebook for dynamic scheduled downlink (DL) messages; and
merge the single codebook into the second codebook in response to determining the overlap exists.

21. A base station, comprising:
a memory storing instructions; and
one or more processors coupled with the memory, wherein the one or more processors are configured to:
transmit, to a user equipment (UE), a configuration message indicating one or more parameters for the UE to receive a semi-persistent scheduling (SPS) message;
transmit, to the UE, a message indicating activation or reactivation of SPS between the base station and the UE, wherein the message further indicates a first resource for transmitting a first acknowledgement/negative-acknowledgement (ACK/NACK) to acknowledge reception of the message, a first offset value for the first ACK/NACK, and a second offset value for a second ACK/NACK to acknowledge reception of the SPS message;
receive, from the UE and based on the first offset value, the first ACK/NACK on the first resource to acknowledge reception of the message;
transmit, to the UE, the SPS message subsequent to the message being transmitted; and
receive, from the UE and based on the second offset value, the second ACK/NACK to acknowledge reception of the SPS message on a second resource, wherein the second resource is indicated by the configuration message.

22. The base station of claim 21, wherein the message comprises one or more parameters for the activation or the reactivation of the SPS.

23. The base station of claim 22, wherein the one or more parameters for the activation or the reactivation of the SPS include a modulation and coding scheme for SPS transmissions, and a DL SPS time and frequency allocation.

24. The base station of claim 21, wherein the second offset value is different from the first offset value.

25. The UE of claim 15, wherein the one or more parameters are indicated by the message in a physical uplink (UL) control channel (PUCCH) resource indicator (PRI).

26. The UE of claim 14, wherein the message is a downlink (DL) control information (DCI) message.

27. The UE of claim 14, wherein the configuration message is a radio resource control (RRC) message.

28. The base station of claim 22, wherein the one or more parameters are indicated by the message in a physical uplink (UL) control channel (PUCCH) resource indicator (PRI).

29. The base station of claim 21, wherein the message is a downlink (DL) control information (DCI) message.

30. The base station of claim 21, wherein the configuration message is a radio resource control (RRC) message.

* * * * *